(12) United States Patent
Park

(10) Patent No.: US 10,102,786 B2
(45) Date of Patent: Oct. 16, 2018

(54) APPARATUS AND METHOD FOR DISPLAYING DATA IN PORTABLE TERMINAL

(71) Applicant: Samsung Electronics Co., Ltd., Gyeonggi-do (KR)

(72) Inventor: Sang-Min Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 28 days.

(21) Appl. No.: 14/847,557

(22) Filed: Sep. 8, 2015

(65) Prior Publication Data

US 2015/0379779 A1    Dec. 31, 2015

Related U.S. Application Data

(63) Continuation of application No. 13/283,694, filed on Oct. 28, 2011, now Pat. No. 9,245,469.

(30) Foreign Application Priority Data

Nov. 1, 2010    (KR) .................. 10-2010-0107538

(51) Int. Cl.
*G09G 5/14*    (2006.01)
*G09G 3/02*    (2006.01)
(Continued)

(52) U.S. Cl.
CPC ............. *G09G 3/02* (2013.01); *G06F 3/005* (2013.01); *G06F 3/0482* (2013.01);
(Continued)

(58) Field of Classification Search
CPC ........................................ G09G 3/001
(Continued)

(56) References Cited

U.S. PATENT DOCUMENTS 7,227,893 B1 *  6/2007  Srinivasa ........... G06K 9/00771
                                                    348/155
7,325,933 B2 *  2/2008  Kaise ..................... H04N 5/74
                                                    348/E5.137
(Continued)

FOREIGN PATENT DOCUMENTS

JP    2010-34820 A    2/2010
WO   2006/063577 A1    6/2006

OTHER PUBLICATIONS (Jul. 7, 2010), "A pattern language for interactive tabletops in collaborative workspaces", Published by ACM, Christin Remy et al.*

(Continued)

*Primary Examiner* — Javid A Amini
(74) *Attorney, Agent, or Firm* — Cha & Reiter, LLC.

(57) ABSTRACT

An apparatus and method for displaying data in a portable terminal to control data displayed on a projection beam screen. The apparatus includes a beam projector unit for displaying data on a beam screen, at least one camera unit for capturing the data displayed on the beam screen, and a controller for extracting a differential region between data to be displayed on the beam screen and the displayed data captured by the camera unit and displaying the data on the beam screen according to a display screen region excluding the differential region therefrom.

20 Claims, 9 Drawing Sheets

(51) Int. Cl.
*G06F 3/00* (2006.01)
*G06F 3/0482* (2013.01)
*G06F 3/0488* (2013.01)
*G06T 19/00* (2011.01)

(52) U.S. Cl.
CPC ........ *G06F 3/04886* (2013.01); *G06T 19/006* (2013.01); *G09G 2354/00* (2013.01)

(58) Field of Classification Search
USPC ........................................................ 345/633
See application file for complete search history.

(56) References Cited

U.S. PATENT DOCUMENTS

| | | | | |
|---|---|---|---|---|
| 7,535,489 | B2* | 5/2009 | Nonaka | G06F 3/0425 345/619 |
| 7,671,916 | B2* | 3/2010 | Hashimoto | G06T 7/285 250/206.1 |
| 8,282,222 | B2 | 10/2012 | Smits | |
| 8,284,996 | B2* | 10/2012 | Winkler | G08G 1/017 382/104 |
| 8,582,092 | B1 | 11/2013 | Yellowhair et al. | |
| 9,632,593 | B2* | 4/2017 | Kasahara | G06F 3/0346 |
| 2001/0036231 | A1 | 11/2001 | Easwar et al. | |
| 2002/0196226 | A1 | 12/2002 | Tegreene et al. | |
| 2003/0071194 | A1* | 4/2003 | Mueller | G01B 11/00 250/208.1 |
| 2004/0046736 | A1* | 3/2004 | Pryor | A63F 13/02 345/156 |
| 2004/0218155 | A1* | 11/2004 | Schenk | G02B 26/105 353/98 |
| 2005/0035943 | A1 | 2/2005 | Kojima | |
| 2005/0089194 | A1* | 4/2005 | Bell | G06F 3/0425 382/103 |
| 2006/0192782 | A1 | 8/2006 | Hildreth | |
| 2007/0035562 | A1* | 2/2007 | Azuma | G03B 13/28 345/633 |
| 2007/0171225 | A1 | 7/2007 | Haex et al. | |
| 2007/0273842 | A1* | 11/2007 | Morrison | G03B 21/14 353/97 |
| 2008/0036976 | A1* | 2/2008 | Han | H04N 9/3194 353/69 |
| 2008/0043093 | A1 | 2/2008 | Song | |
| 2008/0186255 | A1* | 8/2008 | Cohen | G02B 27/017 345/8 |
| 2008/0218611 | A1 | 9/2008 | Parulski et al. | |
| 2009/0009648 | A1 | 1/2009 | Huang | |
| 2009/0102859 | A1* | 4/2009 | Athsani | G06F 3/011 345/619 |
| 2009/0123072 | A1* | 5/2009 | Sasaki | G06K 9/20 382/181 |
| 2009/0168027 | A1* | 7/2009 | Dunn | G03B 21/26 353/28 |
| 2010/0007665 | A1 | 1/2010 | Smith et al. | |
| 2010/0045569 | A1 | 2/2010 | Estevez et al. | |
| 2010/0061707 | A1 | 3/2010 | Kosakai et al. | |
| 2010/0066689 | A1* | 3/2010 | Jung | H04N 21/42203 345/173 |
| 2010/0067181 | A1* | 3/2010 | Bair | G06F 1/1616 361/679.3 |
| 2010/0177929 | A1* | 7/2010 | Kurtz | G06K 9/00228 382/103 |
| 2010/0177931 | A1* | 7/2010 | Whytock | G06F 3/0416 382/103 |
| 2010/0188478 | A1* | 7/2010 | Robinson | H04N 7/15 348/14.16 |
| 2010/0238194 | A1* | 9/2010 | Roach, Jr. | H04M 3/42 345/629 |
| 2010/0265313 | A1 | 10/2010 | Liu et al. | |
| 2010/0328344 | A1* | 12/2010 | Mattila | G06F 1/1626 345/633 |
| 2011/0019162 | A1* | 1/2011 | Huebner | G03B 21/145 353/79 |
| 2011/0052083 | A1* | 3/2011 | Rekimoto | H04N 1/00244 382/218 |
| 2011/0196377 | A1 | 8/2011 | Hodorek et al. | |
| 2011/0254976 | A1 | 10/2011 | Garten | |
| 2011/0267460 | A1 | 11/2011 | Wang | |
| 2011/0312374 | A1* | 12/2011 | Chen | H04N 5/23222 455/556.1 |
| 2012/0033066 | A1 | 2/2012 | Wieser | |
| 2012/0072147 | A1 | 3/2012 | Lee et al. | |
| 2012/0105477 | A1 | 5/2012 | Park | |
| 2012/0122528 | A1* | 5/2012 | Lyons | G07F 17/3241 463/1 |
| 2012/0154619 | A1* | 6/2012 | Lee | G06K 9/228 348/222.1 |
| 2012/0206577 | A1* | 8/2012 | Guckenberger | G06T 11/00 348/47 |
| 2012/0223883 | A1 | 9/2012 | Solomon | |
| 2012/0224062 | A1 | 9/2012 | Lacoste et al. | |
| 2013/0002832 | A1* | 1/2013 | Lasenby | A61B 5/0064 348/51 |
| 2013/0038633 | A1 | 2/2013 | Maggiore | |
| 2013/0050070 | A1 | 2/2013 | Lewis et al. | |
| 2013/0088596 | A1 | 4/2013 | Raita et al. | |
| 2013/0215148 | A1* | 8/2013 | Antonyuk | G06T 19/006 345/633 |
| 2013/0253824 | A1* | 9/2013 | Yang | G01C 21/20 701/522 |
| 2013/0297416 | A1 | 11/2013 | Dipaola et al. | |
| 2015/0235432 | A1* | 8/2015 | Bronder | G06T 3/60 345/633 |

OTHER PUBLICATIONS

DIY Design Process for Interactive Surfaces, Jennifer G. Sheridan et al., 2009.*
Korean Search Report, dated Aug. 1, 2016.

* cited by examiner

APPARATUS AND METHOD FOR DISPLAYING DATA IN PORTABLE TERMINAL

CROSS REFERENCE TO RELATED APPLICATIONS

This application is a Continuation of U.S. patent application Ser. No. 13/283,694 filed on Oct. 28, 2011 which claims the benefit of priority under 35 U.S.C. § 119(a) from a Korean Patent Application filed in the Korean Intellectual Property Office on Nov. 1, 2010 and assigned Serial No. 10-2010-0107538, the entire disclosure of which is hereby incorporated by reference in its entirety.

BACKGROUND

1. Field of the Invention

The present invention generally relates to an apparatus and method for displaying data in a portable terminal. More particularly, the present invention relates to an apparatus and method for displaying data in a portable terminal to control data displayed on a beam screen, particularly in an augmented reality content.

2. Description of the Related Art

A beam projector provided in a portable terminal, or a portable beam projector, is used to share information from among about 10 persons or less in a relatively small space. A presentation may be under space constraints due to the small space, and the beam projector, by its nature, is vulnerable to obstacles in its path.

At present, a beam projector is merely used to show a screen for movie watching, etc., such that a portable terminal having a beam projector function has not yet been developed and the utilization of the beam projector has been realized.

With the development of smart phones, a large number of applications using augment reality have been recently developed. At present, development of augment reality techniques mainly focus on a function of providing additional information about a currently captured image in view of cameras.

Augment reality functions such that additional information is overlaid on a currently displayed screen. There can be problems with the additional information serving as an obstacle to view what has been captured by, for example, a camera. The problem with obstacles is particularly critical with small screens such as arranged in a mobile terminal. However, due to portability and product costs, a number of problems exist in increasing physical Liquid Crystal Display (LCD) size to permit practical viewing. Moreover, for simple data representation, additional User Interface (UI) flows may be generated.

SUMMARY

Accordingly, an exemplary aspect of the present invention is to provide an apparatus and method for displaying data in a portable terminal, in which data can be displayed on a beam screen without being interrupted by an obstacle.

Another exemplary aspect of the present invention is to provide an apparatus and method for displaying data in a portable terminal, in which related data between at least two objects can be displayed through data displayed on a projection beam screen.

Furthermore, another exemplary aspect of the present invention is to provide an apparatus and method for displaying data in a portable terminal, in which data can be transmitted between two portable terminals connected by wireless communication through data displayed on a projection beam screen.

Still another exemplary aspect of the present invention is to provide an apparatus and method for displaying data in a portable terminal, in which data regarding the same menu of two portable terminals connected by wireless communication can be integrated and displayed through data displayed on a projection beam screen.

Yet another exemplary aspect of the present invention is to provide an apparatus and method for displaying data in a portable terminal, in which information is dynamically displayed by using an as large as possible portion of a display screen through data displayed on a projection beam screen, thus displaying a lot of information of augment reality.

According to still another exemplary aspect of the present invention, there is provided an apparatus and method for displaying data in a portable terminal, the apparatus including a beam projector unit for displaying data on a projection beam screen, at least one camera unit for capturing the data displayed on the projection beam screen, and a controller for extracting a differential region between additional data to be displayed on the projection beam screen and the already displayed data captured by the camera unit and displaying the additional data on the beam screen according to a display screen region excluding the differential region therefrom.

According to yet still another exemplary aspect of the present invention, there is provided an apparatus for displaying data in a portable terminal, the apparatus including a beam projector unit for displaying data on a projection beam screen, at least one camera unit for capturing at least two objects and the data displayed on the projection beam screen, and a controller for searching for related data between the at least two captured objects, displaying a list of the related data on the projection beam screen, displaying data selected from the list on the projection beam screen.

According to another exemplary aspect of the present invention, there is provided an apparatus for displaying data in a portable terminal, the apparatus including a wireless communication unit for connecting (i.e. coupling) with a counterpart portable terminal through wireless communication, at least one beam projector unit for displaying data on a projection beam screen, at least one camera unit for capturing the data displayed on the projection beam screen, and a controller for displaying data of the portable terminal and data of the counterpart portable terminal in positions of two objects, respectively, on the projection beam screen, and transmitting data selected by an action of one of the objects on the projection beam screen to the counterpart portable terminal.

According to another exemplary aspect of the present invention, there is provided an apparatus for displaying data in a portable terminal, the apparatus including a wireless communication unit for connecting with a counterpart portable terminal through wireless communication, at least one beam projector unit for displaying data on a projection beam screen, at least one camera unit for capturing the data displayed on the projection beam screen, and a controller for displaying menu types of the portable terminal and menu types of the counterpart portable terminal in positions of two objects, respectively, on the beam screen, determining whether the same menu is selected on the projection beam screen by actions of the two objects, and if so, integrating data regarding the same menu of the portable terminal and data regarding the same menu of the counterpart portable terminal and displaying the integrated data on the projection beam screen.

According to another exemplary aspect of the present invention, there is provided a method for displaying data in a portable terminal, the method including displaying data on a projection beam screen, capturing the data displayed on the projection beam screen, and extracting a differential region between data to be displayed on the projection beam screen and the captured data and displaying the data on the beam screen according to a display screen region excluding the differential region therefrom.

According to another exemplary aspect of the present invention, there is provided a method for displaying data in a portable terminal, the method including capturing at least two objects, searching for related data between the at least two captured objects and displaying a list of the related data on a projection beam screen, and displaying data selected from the list of the related data on the projection beam screen.

According to another exemplary aspect of the present invention, there is provided a method for displaying data in a portable terminal, the method including connecting with a counterpart portable terminal through wireless communication, displaying data of the portable terminal and data of the counterpart portable terminal in positions of two objects on a projection beam screen, and transmitting selected data on the projection beam screen to the counterpart portable terminal by an action of one of the two objects.

According to another exemplary aspect of the present invention, there is provided a method for displaying data in a portable terminal, the method including connecting with a counterpart portable terminal through wireless communication, displaying menu types in positions of two objects on a projection beam screen, respectively, determining whether the same menu is selected on the projection beam screen by actions of the two objects, and if so, integrating data regarding the same menu of the portable terminal and data regarding the same menu of the counterpart portable terminal and displaying the integrated data on the projection beam screen.

BRIEF DESCRIPTION OF THE DRAWINGS

The above and other exemplary aspects and advantages of the presently claimed invention according to certain exemplary embodiments of the present invention shown and described herein will become more apparent from the following detailed description taken in conjunction with the accompanying drawings, in which:

DETAILED DESCRIPTION

Figure 1:
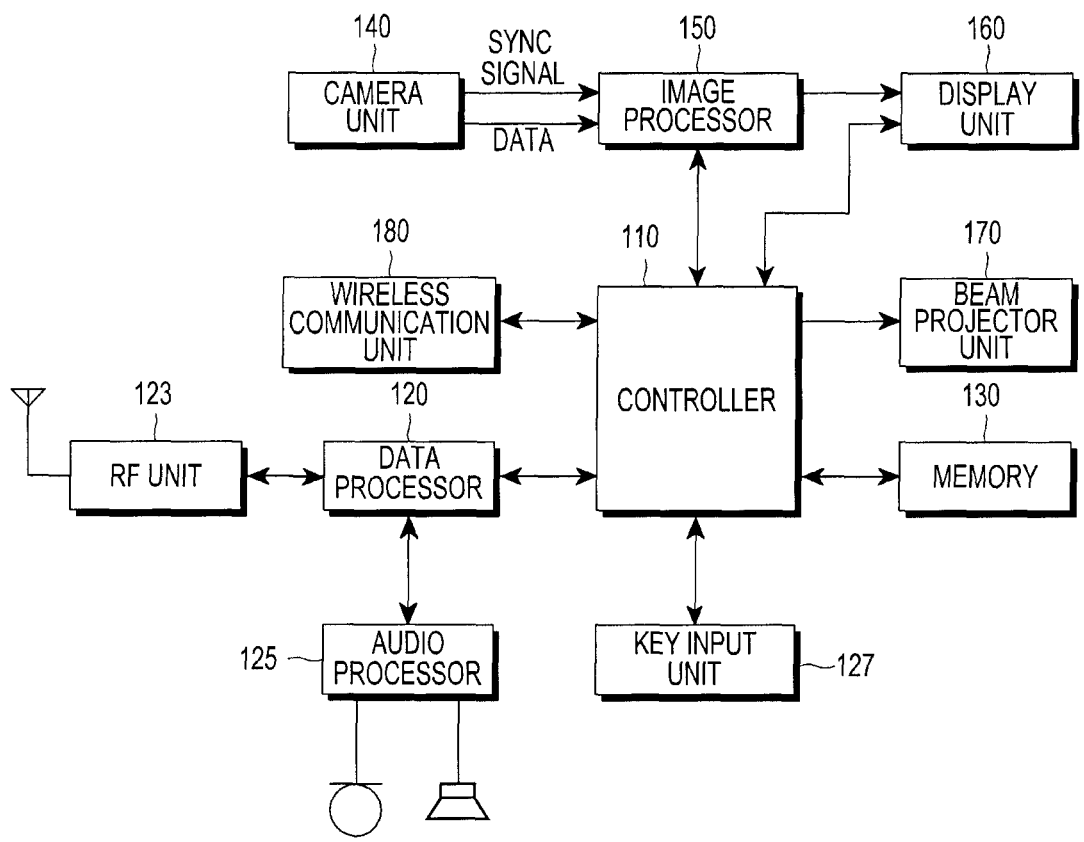
FIG. 1 is a block diagram of a portable terminal according to an exemplary embodiment of the present invention.

Hereinafter, exemplary embodiments of the present invention will be described in detail with reference to the accompanying drawings. Throughout the drawings, like components will be indicated by like reference numerals.

FIG. 1 is a block diagram of a portable terminal according to an exemplary embodiment of the present invention.

Referring now to FIG. 1, a Radio Frequency (RF) unit 123 performs a wireless communication function of the portable terminal. The RF unit 123 preferably includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. In other words, the data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions. A person of ordinary skill in the art understands that a touchscreen could be provided as an alternative or additive input unit.

A memory 130 comprises a non-transitory machine readable medium that includes program and data memories. The program portion of the memory 130 stores programs for controlling a general operation of the portable terminal and programs for controlling data displayed on a beam screen according to an embodiment of the present invention.

A controller 110 (e.g. processor or microprocessor) controls overall operation of the portable terminal.

According to a first exemplary embodiment of the present invention, the controller 110 controls a camera unit 140 to capture data, which is displayed by a beam projector unit 170 in a beam projection mode.

The controller 110 extracts a differential display screen region between data for display by the beam projector unit 170 and the data captured by the camera unit 140, redefines a display screen region by excluding the differential region from the display screen region, and displays the data according to the redefined display screen region on a projection beam screen.

According to a second exemplary embodiment of the present invention, the controller 110 searches in the memory 130 for related data between at least two objects captured by the camera unit 140, and displays a list of the found related data (or a related data list) on the projection beam screen through the beam projector unit 170.

During display of the related data list on the beam screen, if the found related data list to be displayed on the beam screen and a related data list acquired by capturing the displayed related data list through the camera unit 140 are not the same as each other, the controller 110 extracts a differential screen region and determines that data located in the differential screen region is selected by an object, thus displaying the selected data on the projection beam screen.

The related data list displayed on the projection beam screen may include a communication list such as a Short Messaging Service (SMS) message and an e-mail transmitted and received between the at least two objects and related images between the two objects.

According to a third exemplary embodiment of the present invention, the controller 110 connects the portable terminal with a counterpart portable terminal through a wireless communication unit 180 and displays data of the portable terminal and data received from the counterpart portable terminal in corresponding positions of the two objects, respectively, on the projection beam screen.

If a differential display screen region is generated between data to be displayed on the beam screen and data captured by the camera unit 140, the controller 110 recognizes the generation as an action of an object for data selection/movement.

The controller 110 displays an image showing that according to the object's action, selected data moves to the counterpart portable terminal on the projection beam screen.

Upon determining that reception of the data is permitted by the counterpart portable terminal through an action of the other object on the projection beam screen, the controller 110 transmits the selected data to the counterpart portable terminal through the wireless communication unit 180.

The controller 110 may recognize the action of the other object on the beam screen through the differential region generated between the data to be displayed on the projection beam screen and the data captured by the camera unit 140.

The data displayed in the corresponding positions of the two objects may be Social Network Service (SNS) lists.

The data displayed in the corresponding positions of the two objects may be displayed on the beam screen through two beam projector units 170 included in the portable terminal.

The data displayed in the corresponding positions of the two objects may also be displayed on the beam screen through the beam projector units 170 included in the portable terminal and the counterpart portable terminal connected by wireless communication, respectively.

According to a fourth exemplary embodiment of the present invention, the controller 110 connects the portable terminal with the counterpart portable terminal through the wireless communication unit 180, and displays types of menus in corresponding positions of the two objects on the projection beam screen.

Upon generation of the differential region between the data to be displayed on the projection beam screen and the data captured by the camera unit 140, the controller 110 recognizes the generation as an action of the object for menu selection/movement.

The controller 110 determines whether menus selected by actions of the two objects on the projection beam screen are the same each other, and if so, the controller 110 receives data regarding the selected menu from the counterpart portable terminal through the wireless communication unit 180.

The controller 110 integrates data of the portable terminal and the data received from the counterpart portable terminal and displays the integrated data on the projection beam screen.

Types of menus displayed on the projection beam screen may include a schedule, a music list, and contact information.

The types of menus displayed in the corresponding positions of the two objects may be displayed on the projection beam screen by two beam projector units 170 included in the portable terminal.

The types of the menus displayed in the corresponding positions of the two objects may also be displayed on the projection beam screen by two beam projector units 170 included in the portable terminal and the counterpart portable terminal connected by wireless communication, respectively.

A camera unit 140 captures an image, and may preferably include a camera sensor for converting an optical signal of the captured image into an electrical signal, and a signal processor for converting an analog image signal of the image captured by the camera sensor into digital data. Herein, it is assumed that the camera sensor, for illustrative purposes, comprises a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

According to an exemplary embodiment of the present invention, at least one camera unit 140 may be included in the portable terminal and capture at least two objects or data displayed on the beam screen.

According to an exemplary embodiment of the present invention, the camera unit 140 is arranged substantially linearly with the beam projector unit 170 and an angle between the camera unit 140 and the beam projector unit 170 may be adjusted.

An image processor 150 performs Image Signal Processing (ISP) in order to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 preferably includes an image codec, and compresses the frame image data displayed on the display unit 160 in a preset manner or restores the compressed frame image data to the original frame image data. Herein, the image codec may comprise a Joint Picture Experts Group (JPEG) codec, a Moving Picture Experts Group 4 (MPEG4) codec, or a Wavelet codec, just to name some possible examples of the codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may comprise a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

The display unit 160 may display data to be displayed by the beam projector unit 170 according to an exemplary embodiment of the present invention.

According to an exemplary embodiment of the present invention, at least one beam projector unit 170 may be provided, and may display data stored in the portable terminal or data of an external device connected to the portable terminal in a wired or wireless manner on a display screen region for display on the beam screen.

According to an exemplary embodiment of the present invention, the beam projector unit 170 may be arranged in a line with the camera unit 140 and an angle between the beam projector unit 170 and the camera unit 140 may be adjusted.

The wireless communication unit 180 preferably connects the portable terminal with the counterpart portable terminal in a wireless manner, and transmits data to or receives data from the counterpart portable terminal wirelessly connected with the portable terminal. The wireless communication unit 180 may use, for example, WiFi, infrared communication, or Bluetooth communication.

Hereinafter, a control operation with respect to data displayed on the beam screen in the portable terminal will be described in detail with reference to FIGS. 2 through 9.

Figure 2:
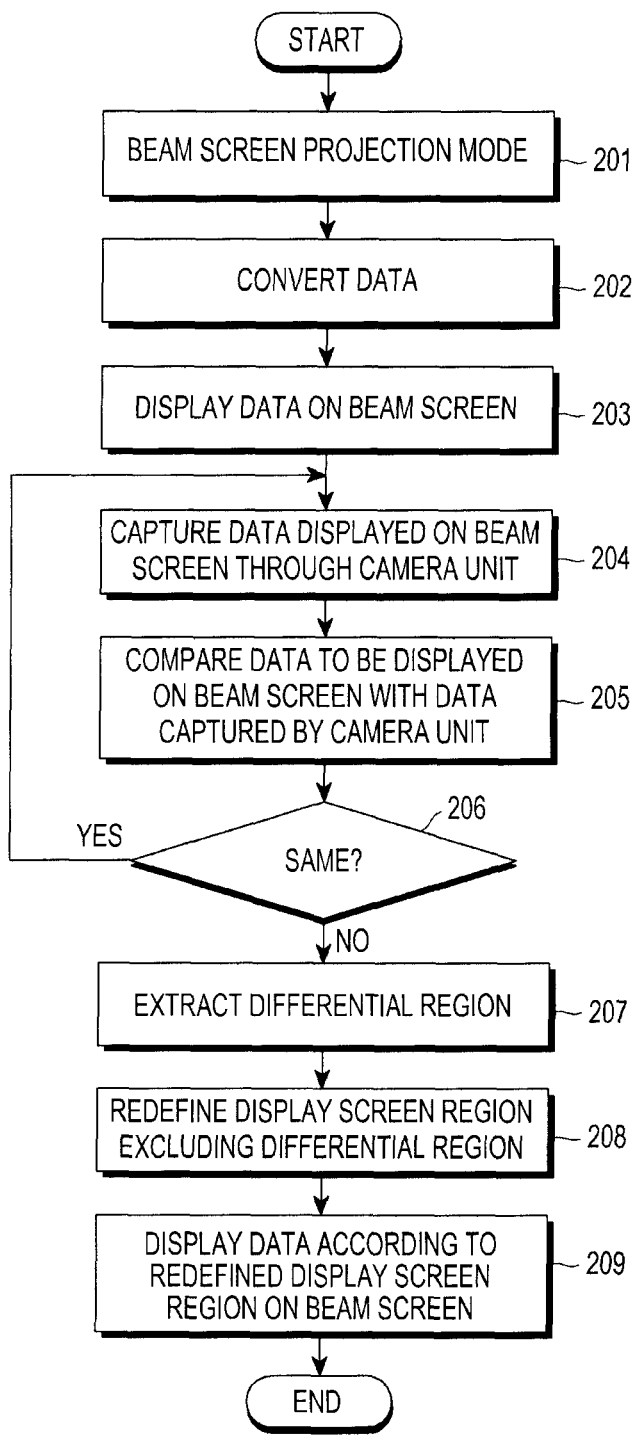
FIG. 2 is a flowchart illustrating a process of displaying data on a beam screen in a portable terminal according to a first exemplary embodiment of the present invention.

FIG. 2 is a flowchart illustrating an example of an operational process of displaying data on the beam screen in the portable terminal according to the first exemplary embodiment of the present invention, and FIG. 3 is a diagram for describing FIG. 2.

A detailed description will now be made of the first embodiment of the present invention, also referring to FIG. 1 as well as FIGS. 2 and 3.

Referring now to FIG. 2, in step 201 which is the beam projection mode of the portable terminal, the controller 110 converts additional data selected by a user to be displayed on the beam screen into flexible data in step 202.

In step 202, the controller 110 may convert additional data to be displayed on the beam screen by using a flexible markup language, an Extensible Application Markup Language (XAML).

A flexible document is defined by using the XAML and an XML-based standard generation language, and especially, the XAML is intuitive because of being similar to a Hypertext Markup Language (HTML).

The flexible document facilitates dynamically converting additional data such that it can be easily used to redefine a display screen region for display on the beam screen in step 208.

The controller 110 displays the data converted into the flexible document in step 202 on the beam screen through the beam projector unit 170 in step 203.

During display of the data on the beam screen, the controller 110 controls the camera unit 140 to capture the data displayed on the beam screen in step 204. In step 205, the controller 110 then compares the converted additional data to be displayed on the beam screen in step 202 with the data captured by the camera unit 140 in step 204.

If the converted additional data to be displayed on the beam screen in step 202 and the data captured by the camera unit 140 in step 204 are the same as each other, the controller 110 at step 206 recognizes the comparison result and continues displaying the converted data in step 203.

However, if the converted additional data to be displayed and the data captured are not the same, the controller 110 recognizes the comparison result in step 206 and extracts a differential region between the converted additional data and the captured data in step 207.

In step 208, the controller 110 redefines a display screen region for displaying the data on the beam screen by excluding the differential region from the display screen region.

Once the display screen region is redefined in step 208, the controller 110 displays the data converted in step 202 according to the redefined display screen region on the beam screen in step 209.

Figure 3A:
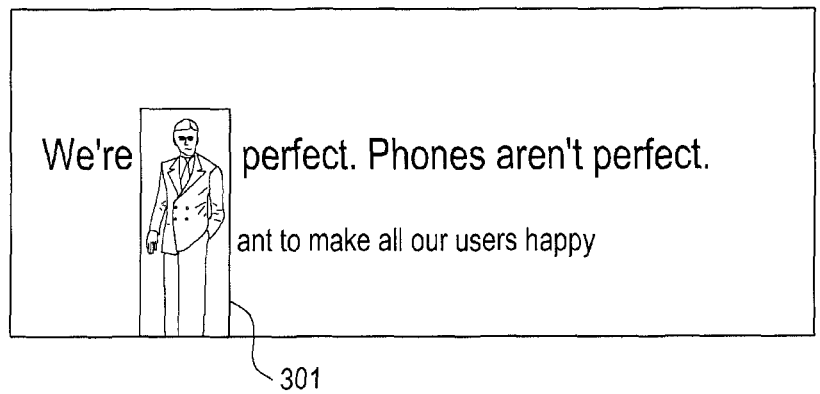
FIG. 3A, FIG. 3B, and FIG. 3C are diagrams illustrating part of the flowchart of FIG. 2.

Referring now to FIG. 3, which illustrates the process of FIG. 2, as shown in FIG. 3(a), during display of data on the projection beam screen, a portion of the data may not be seen because of being hidden by an object in region 301 who is making a presentation regarding the data.

Figure 3B:
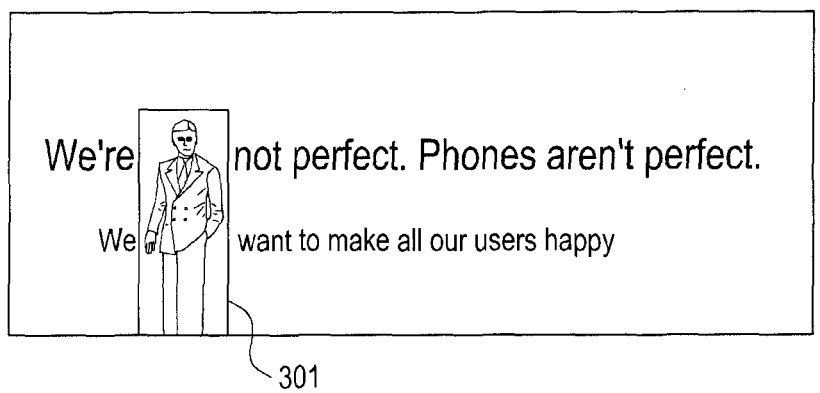
Figure 3C:
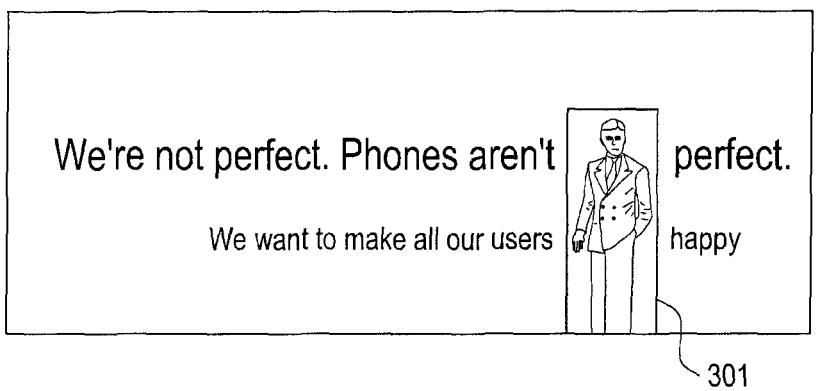

Thus, in steps 204 through 208, the display screen region is redefined by excluding the differential region generated between the converted additional data to be displayed on the beam screen and the data captured by the camera unit 140. In other words, by excluding the object region 301, and the data is displayed according to the redefined display screen region on the beam screen, such that the data can be completely displayed on the beam screen without any portion of the data being obscured by moving the object region 301 to a position where the data is not obscured, as shown in FIG. 3(b) and FIG. 3(c).

Figure 4:
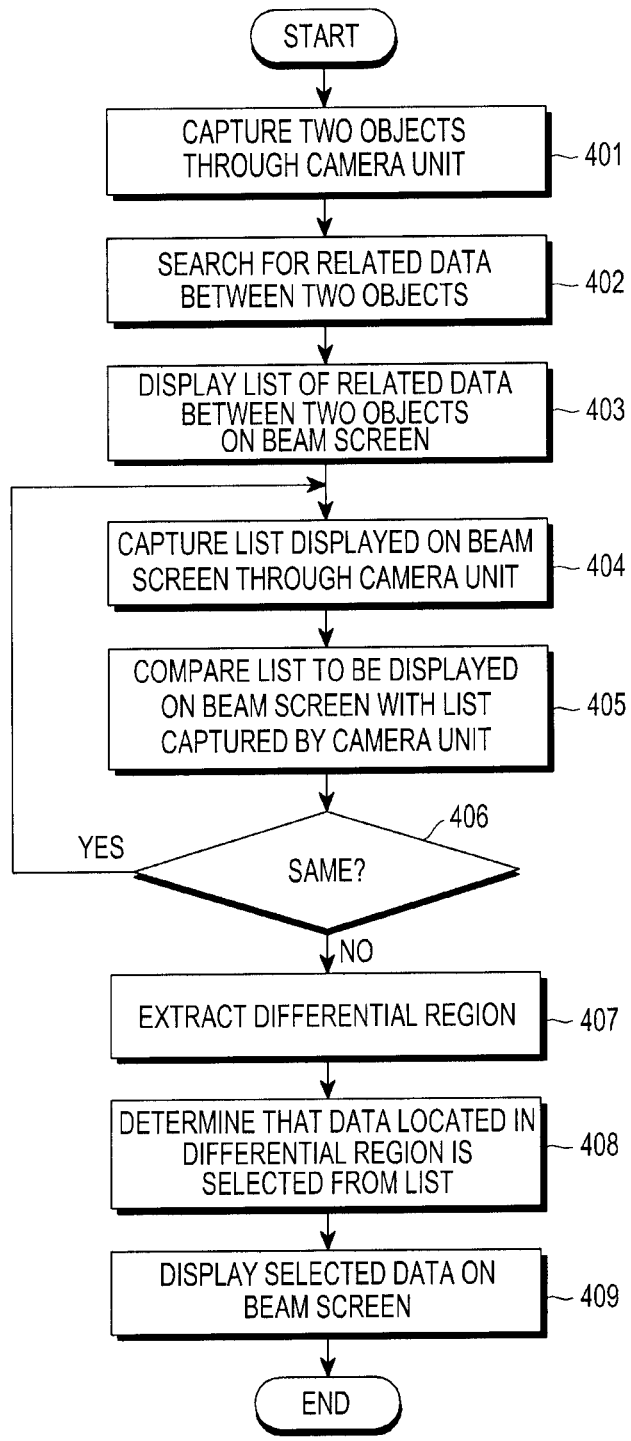
FIG. 4 is a flowchart illustrating a process of displaying related data between two objects on a beam screen in a portable terminal according to a second exemplary embodiment of the present invention.
Figure 5A:
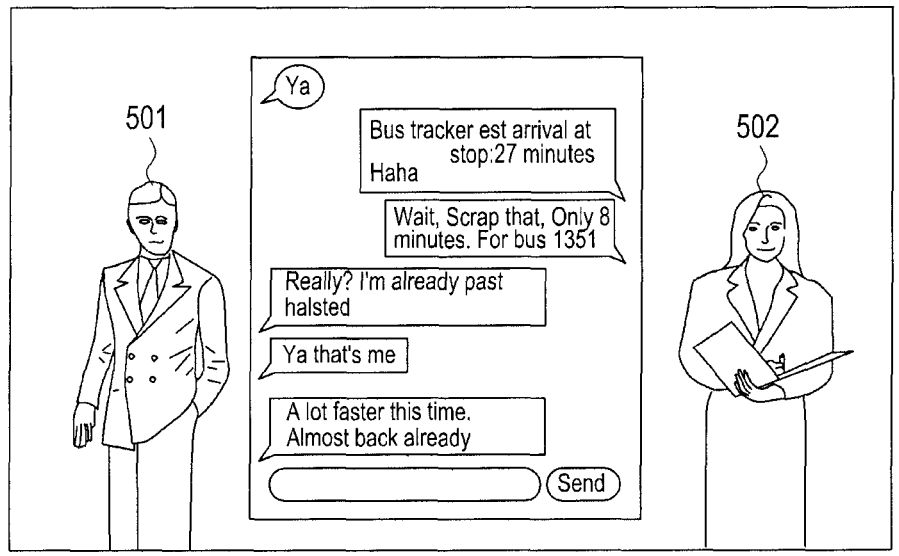
FIG. 5A and FIG. 5B are diagrams illustrating part of the flowchart of FIG. 4.
Figure 5B:
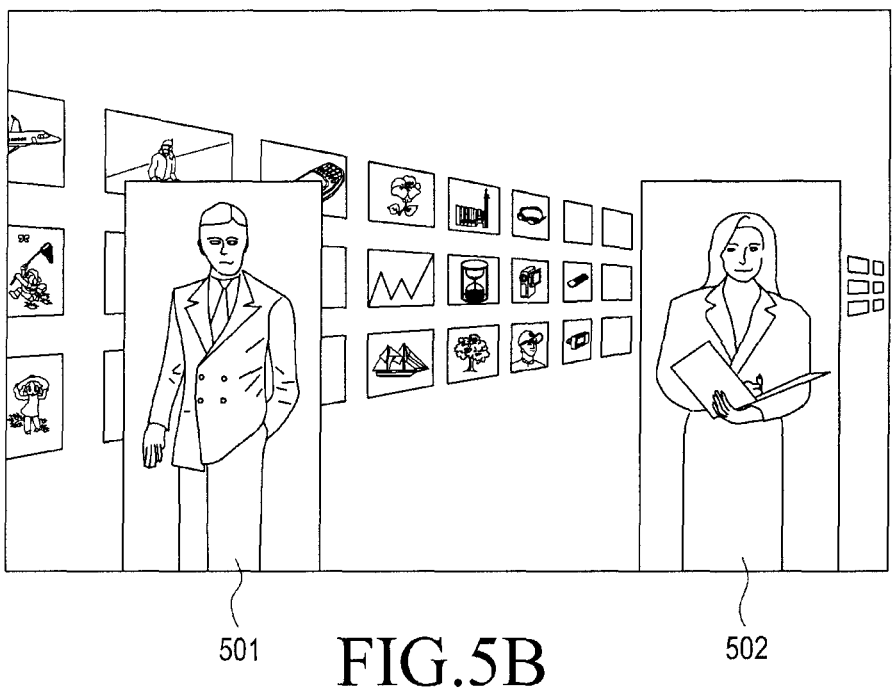

FIG. 4 is a flowchart illustrating a process of displaying related data between two objects on a beam screen in a portable terminal according to the second exemplary embodiment of the present invention, and FIG. 5 is a diagram for describing FIG. 4.

Referring to FIG. 1 as well as FIGS. 4 and 5, the second exemplary embodiment of the present invention will now be described in more detail.

Referring now to FIG. 4, once two objects are captured through one or two camera units 140 included in the portable terminal in step 401, the controller 110 extracts faces from the captured two objects and extracts information about the objects, which match the extracted faces, from the memory 130. The face extraction technique is known by a person of ordinary skill in the art.

In step 402, the controller 110 searches for related data between the two objects from data stored in the memory 130 of the portable terminal, e.g., SMS messages, e-mails, image data, etc. Note that the related data is based on identifying the faces extracted in step 401.

Once the related data between the two objects is found in step 402, then at step 403 the controller 110 displays a list of the related data (or a related data list) on the beam screen through the beam projector unit 170.

During display of the related data list on the beam screen, the controller 110 controls the camera unit 140 to capture the related data list displayed on the beam screen in step 404, and at step 405 compares the found related data list to be displayed on the beam screen with the related data list captured through the camera unit 140.

If the related data list to be displayed on the beam screen is not the same as the related data list captured by the camera unit 140 in step 405, the controller 110 recognizes the comparison result in step 406 and at step 407 extracts a differential region between the two related data lists.

If the position of the differential region is the same as the position of predetermined data of the displayed related data list, the controller 110 at step 408 determines that the predetermined data is selected from the displayed related data list through a particular action of one of the two objects.

If the predetermined data located in the position of the differential region is selected from the displayed related data list in step 408, the controller 110 recognizes the selection and displays the selected data on the beam screen in step 409.

The selection of the predetermined data may be performed by input of a particular key provided in the key input unit 127.

The related data list may include SMS messages and e-mails transmitted and received between the two objects and images related to the two objects.

Referring now to FIG. 5 to describe the process of FIG. 4, FIG. 5(*a*) shows that SMS data transmitted and received between two captured objects 501 and 502 is displayed on a projection beam screen. FIG. 5(*b*) shows that related image data between the two captured objects 501 and 502 is displayed on the beam screen.

Figure 6:
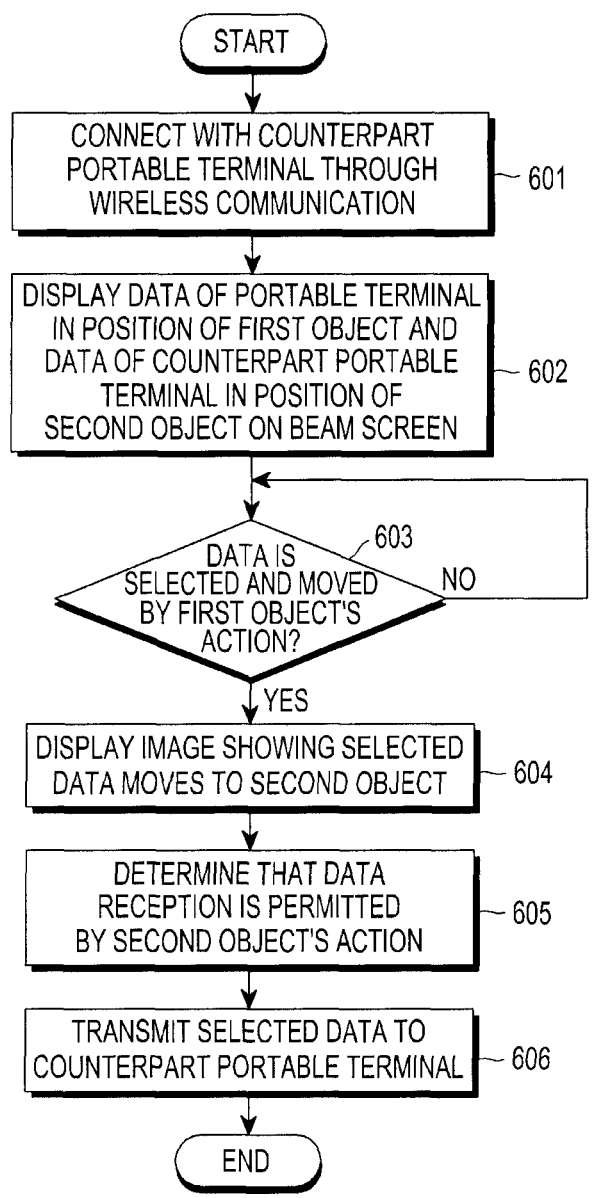
FIG. 6 is a flowchart illustrating a process of transmitting data to a counterpart portable terminal connected to a portable terminal by wireless communication through a user's action on a beam screen in the portable terminal according to a third exemplary embodiment of the present invention.
Figure 7A:
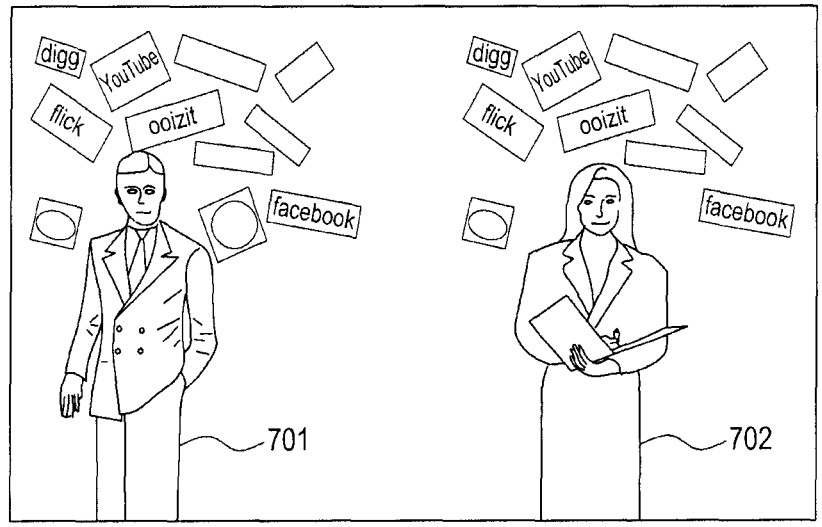
FIG. 7A and FIG. 7B are diagrams illustrating part of the flowchart of FIG. 6.
Figure 7B:
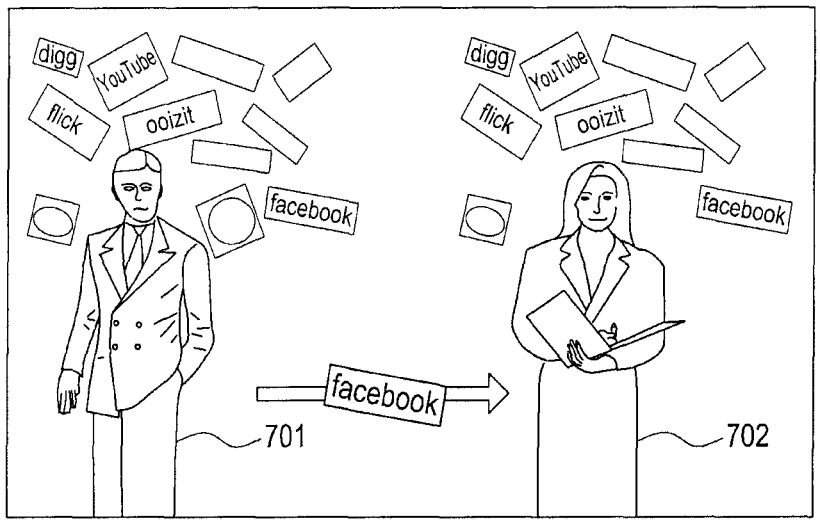

FIG. 6 is a flowchart illustrating a process of transmitting data to a counterpart portable terminal connected to a portable terminal by wireless communication through a user's action on a beam screen in the portable terminal according to the third exemplary embodiment of the present invention, and FIG. 7 is a diagram for illustrating certain details of FIG. 6.

Referring now to FIG. 1 in conjunction with FIGS. 6 and 7, the third exemplary embodiment of the present invention will be described in detail.

Referring to FIG. 6, once the portable terminal is connected with the counterpart portable terminal through the wireless communication unit 180 in step 601, the controller 110 displays data of the portable terminal in a position of a first object, who is a user of the portable terminal, on the beam screen and displays data of the counterpart portable terminal in a position of a second object who is a user of the counterpart portable terminal on the beam screen in step 602.

In step 602, the controller 110 controls the display of data of the portable terminal and the data of the counterpart portable terminal on the beam screen through, for example, one or two beam projector units 170 included in the portable terminal.

In step 602, the controller 110 receives data from the counterpart portable terminal connected through the wireless communication unit 180, and displays the received data in the position of the second object on the beam screen.

If selection and movement of predetermined data from the displayed data of the portable terminal made by an action of the first object are recognized in step 603, the controller 110 at step 604 recognizes the selection and movement and displays an image showing that the selected data moves to the counterpart portable terminal on the beam screen.

To recognize the first object's action for selection and movement of the data, during display of the data of the portable terminal and the data of the counterpart portable terminal in the positions of the first object and the second object on the beam screen, the controller 110 controls the camera unit 140 to capture the data displayed on the beam screen.

The controller 110 then compares the additional data to be displayed on the beam screen with the data captured by the camera unit 140.

If the additional data to be displayed on the beam screen and the data captured by the camera unit 140 are not the same as each other, the controller 110 recognizes this result and extracts a differential region between the data.

If the position of the differential region is the same as the position of predetermined data of the data of the portable terminal displayed on the beam screen, the controller 110 determines that the predetermined data is selected by the first object's action.

After the first object's action for selecting the predetermined data, if the differential region is extracted sequentially from the position of the first object in which the data of the portable terminal is displayed to the position of the second object in which the data of the counterpart portable terminal is displayed, the controller 110 determines that the first object acts to transmit the selected data to the second object.

Thus, in step 604, the controller 110 displays an image showing that the selected data moves to the second object according to the first object's action.

Once the controller 110 determines that reception of the data is permitted through the second object's action in step 605, the controller 110 at step 606 transmits the data selected by the first object substantially to the counterpart portable terminal through the wireless communication unit 180.

The second object's action for permitting reception of the data in step 605 may be determined through the differential region as in case of the first object's action, and may be determined according to a predefined particular action.

Selection and movement of the predetermined data may be carried out by input of a particular key provided in the key input unit 127.

While it has been described in FIG. 6 that the portable terminal receives data of the counterpart portable terminal connected thereto through wireless communication and displays its data and the received data of the counterpart portable terminal on the beam screen, the data of the portable terminal and the data of the counterpart portable terminal may be displayed on the beam screen through beam projector units respectively provided in the portable terminal and the counterpart portable terminal connected to each other through wireless communication.

Referring now to FIG. 7 to describe the process of FIG. 6, FIG. 7(*a*) shows that data e.g., an SNS service list, of a portable terminal registered by a first object 701 is displayed in a position of the first object 701 and data e.g., an SNS service list, of a counterpart portable terminal registered by a second object 702 is displayed in a position of the second object 702 on a beam screen.

FIG. 7(*b*) shows that an image showing that data "facebook" selected by an action of the first object 701 moves to the second object 702 is displayed on the beam screen.

In FIG. 7(*b*), once the data "facebook" selected by the action of the first object 701 moves to the second object 702, an SNS service, such as sending a friend request, can be simply provided.

Figure 8:
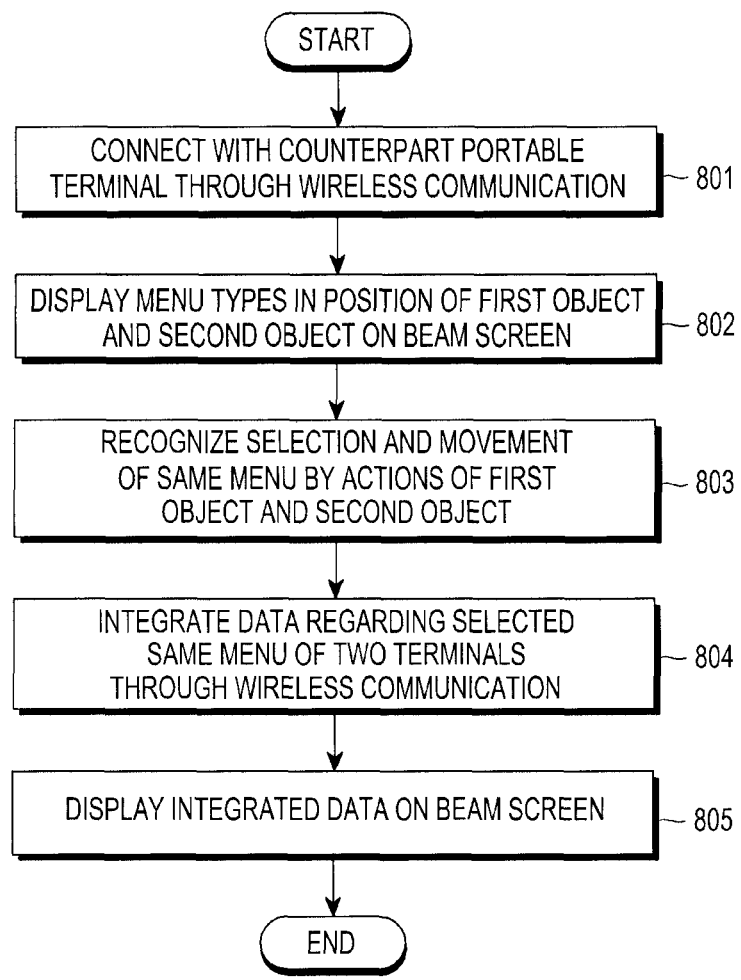
FIG. 8 is a flowchart illustrating a process of integrating and displaying data regarding the same menu of a portable terminal and a counterpart portable terminal connected by wireless communication through a user's action on a beam screen in the portable terminal according to a fourth exemplary embodiment of the present invention.
Figure 9A:
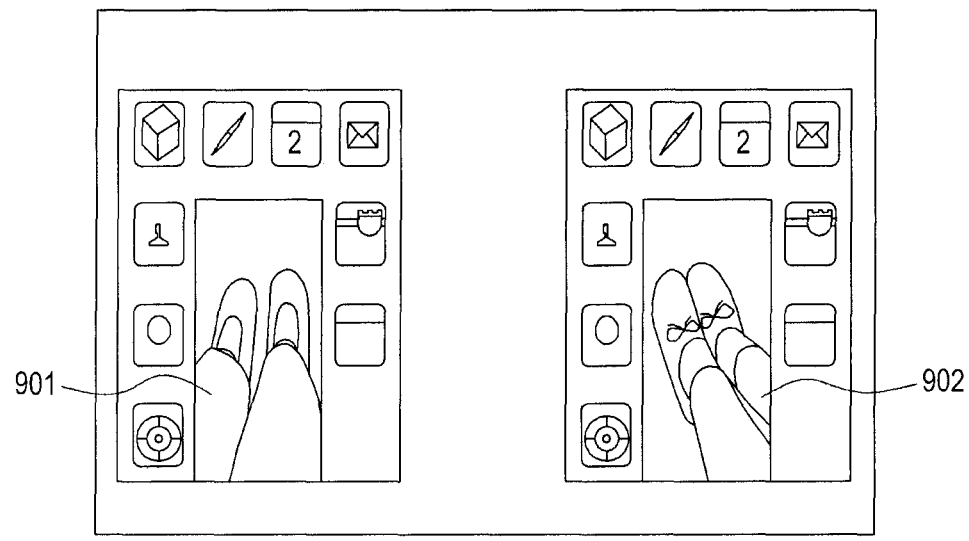
FIG. 9A and FIG. 9B are diagrams for describing FIG. 8.
Figure 9B:
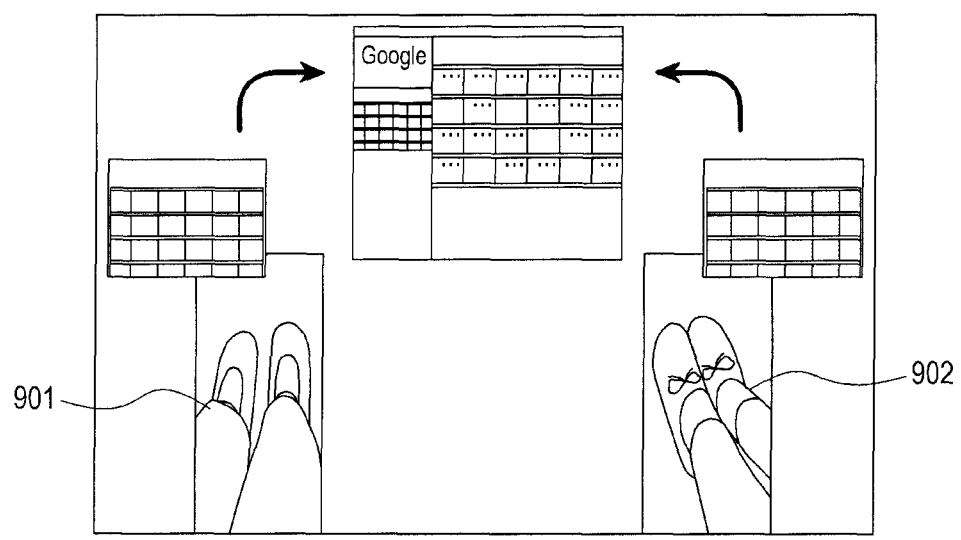

FIG. 8 is a flowchart illustrating a process of integrating and displaying data regarding the same menu of a portable terminal and a counterpart portable terminal connected by wireless communication through a user operation on a beam screen in the portable terminal according to the fourth exemplary embodiment of the present invention, and FIG. 9 is a diagram for describing FIG. 8.

Referring to FIG. 1 in conjunction with FIGS. 8 and 9, the fourth exemplary embodiment of the present invention will be described in detail.

Referring now to FIG. 8, once the portable terminal is connected with the counterpart portable terminal through the wireless communication unit 180 in step 801, the controller 110 displays types of menus of the portable terminal in a position of a first object who is a user of the portable terminal and types of menus of the counterpart portable terminal in a position of a second object who is a user of the counterpart portable terminal on the beam screen in step 802.

In step 802, the controller 110 may display the menu types in the position of the first object on the beam screen and the menu types in the position of the second object on the beam screen through, for example, one or two beam projector units 170 provided in the portable terminal.

If selection and movement of a predetermined menu from the displayed menu types made by an action of the first object and selection and movement of a predetermined menu from the displayed menu types made by an action of the second object are recognized in step 803, the controller 110 determines whether the menus selected by the first object and the second object are the same as each other.

If the menus selected by the first and second objects are recognized as being the same as each other, the controller 110 recognizes the determination, receives data corresponding to the selected menu from the counterpart portable terminal through the wireless communication unit 180, and at step 804 integrates data of the portable terminal corresponding to the selected menu and the received data of the counterpart portable terminal.

The controller 110 at step 805 then displays the integrated data on the beam screen.

To recognize the first object's action and the second object's action for selection and movement of the menus, during display of the menu types in the position of the first object and the position of the second object on the beam screen, the controller 110 controls the camera unit 140 to capture the menu types of the two objects displayed on the beam screen.

The controller 110 compares menu types to be displayed on the beam screen with the displayed menu types captured by the camera unit 140.

If the menu types to be displayed on the beam screen and the displayed menu types captured by the camera unit 140 are not the same as each other, the controller 110 recognizes the result and extracts a differential region between the menu types to be displayed on the beam screen and the captured menu types.

If the position of the differential region is the same as the position of a predetermined menu from the menu types displayed on the projection beam screen, the controller 110 determines that the predetermined menu is selected from the menu types by an action of the first object or the second object.

If the differential region between the menu types to be displayed on the beam screen and the menu types captured by the camera unit 140 is extracted sequentially from the position of the first object or the second object to the position of the second object or the first object after selection of the predetermined menu located in the position of the differential region, the controller 110 may determine that the selected menu is finally selected for integration by the action of the first object or the second object.

The types of menus may include a schedule, a music list, and contact information.

While it has been described in FIG. 8 that the menus are displayed in the position of the first object and the position of the second object, respectively, on the beam screen, the menus may be displayed in the position of the first object and the position of the second object, respectively, on the beam screen through beam projector units respectively provided in the portable terminal and the counterpart portable terminal connected to each other through wireless communication.

Referring now to FIG. 9(*a*) to illustrate some of the process of FIG. 8, FIG. 9(*a*) shows that menu types are displayed in a position around feet of a first object 901 and menu types are displayed in a position around feet of a second object 902.

FIG. 9(*b*) shows that the first object 901 selects a predetermined menu, e.g., a schedule and moves the selected schedule menu, by using feet on the beam screen, and the second object 902 selects a predetermined menu, e.g., a schedule and moves the selected schedule menu, by using feet on the beam screen, such that schedule data of the portable terminal and schedule data of the counterpart portable terminal are integrated and displayed on the beam screen.

As can be anticipated from the foregoing description, by providing the apparatus and method for displaying data in a portable terminal, data can be displayed on the projection beam screen without being interrupted by an obstacle, and related data between at least two objects can be displayed through data displayed on the beam screen.

In addition, data can be transmitted between two portable terminals connected by wireless communication through data displayed on the projection beam screen, and data regarding the same menu of two portable terminals connected by wireless communication can be integrated and displayed through data displayed on the projection beam screen.

Moreover, information is dynamically displayed by using an as large as possible portion of a display screen through data displayed on a projection beam screen, thus displaying a lot of information of augment reality.

The above-described methods according to the present invention can be realized in hardware or via the execution of software or computer code that can be stored in a non-transitory recording medium such as a CD ROM, an RAM, a floppy disk, a hard disk, or a magneto-optical disk or downloaded over a network and stored on a memory, so that the methods described herein can be rendered in such software using a general purpose computer, microprocessor or a special processor or in programmable or dedicated hardware, such as an ASIC or FPGA. As would be understood in the art, the computer, the processor, microprocessor (controller) or the programmable hardware include memory components, e.g., RAM, ROM, Flash, etc. that may store or receive software or computer code that when accessed and executed by the computer, processor or hardware implement the processing methods described herein.

While detailed exemplary embodiments such as a portable terminal have been described in the present invention, various changes may be made without departing from the scope of the present invention. Accordingly, the scope of the present invention should be defined by the claims and equivalents thereof, rather than the described exemplary embodiments.

What is claimed is:

1. An apparatus comprising:
   a memory to store data; and
   a controller operatively coupled with the memory, the controller configured to:
   obtain, via a camera unit operatively coupled with the controller, a first image capturing at least two objects external to the apparatus and further capturing at least one portion of a second image projected by a projector operatively coupled with the controller;
   determine at least one part of the data based at least in part on the at least two objects identified in the obtained first image; and present, via the projector, the determined at least one part of the data proximate to the at least two objects spaced apart from each other external to the apparatus, wherein the second image is generated based on the data stored in the memory.

2. The apparatus of claim 1, wherein the at least one part comprises first data corresponding to a first object of the at least two objects and second data corresponding to a second object of the at least two objects, and wherein determining the at least one part of the data based at least in part on the at least two objects further includes detecting that the at least one portion of the projected second image is overlapping one of the at least two objects as captured in the first image.

3. The apparatus of claim 2, wherein the controller is configured to:

present the first data associated with a first position corresponding to the first object; and present the second data associated with a second position corresponding to the second object, respectively.

4. The apparatus of claim 2, wherein the controller is configured to:

present third data generated by associating the first data and the second data based at least in part on a determination that the first data and the second data is selected by at least one of the at least two objects.

5. The apparatus of claim 1, wherein the at least one part comprises at least one of a message, an e-mail, a schedule, a music, contact information, a social network service list, a menu, or an image.

6. The apparatus of claim 1, wherein the controller is configured to:

obtain another one or more images including the at least one part and at least one of the at least two objects; and identify an action of the at least one in relation with the at least one part based at least in part on the other one or more images.

7. The apparatus of claim 6, wherein the controller is configured to:

present another data corresponding to the at least one part based at least in part on a determination that the action corresponds to the at least one part.

8. The apparatus of claim 6, wherein the controller is configured to:

transmit the at least one part to an electronic device external to the apparatus based at least in part on a determination that the action is to select or move the at least one part, the electronic device corresponding to one of the at least two objects.

9. The apparatus of claim 6, wherein the controller is configured to:

determine a difference between at least two images selected from the image and the other one or more images; and identify the action based at least in part on the difference.

10. The apparatus of claim 1, wherein the at least a part comprises data received from an electronic device external to the apparatus, the electronic device being communicatively coupled with the apparatus.

11. A method comprising:

obtaining, at an electronic device, via a camera unit operatively coupled with the electronic device, A first image capturing at least two objects external to the electronic device and further capturing at least one portion of a second image projected by a projector operatively coupled with the electronic device;

determining at least one part of data based at least in part on the at least two objects identified in the obtained first image; and presenting, via the projector, the determined data proximate to the at least two objects spaced apart from each other external to the electronic device, wherein the second image is generated based on the data stored in a memory.

12. The method of claim 11, wherein the data comprises first data corresponding to a first object of the at least two objects and second data corresponding to a second object of the at least two objects, and wherein determining the at least one part of the data based at least in part on the at least two objects further includes detecting that the at least one portion of the projected second image is overlapping one of the at least two objects as captured in the first image.

13. The method of claim 12, wherein the presenting comprises:

presenting the first data associated with a first position corresponding to the first object; and presenting the second data associated with a second position corresponding to the second object, respectively.

14. The method of claim 12, comprising:

presenting third data generated by associating the first data and the second data based at least in part on a determination that the first data is selected by the first object and the second data is selected by the second object.

15. The method of claim 11, wherein the presenting comprises:

presenting, as the data, at least one of a message, an e-mail, a schedule, a music, contact information, a social network service list, a menu, or an image.

16. The method of claim 11, comprising:

obtaining another one or more images including the data and at least one of the at least two objects; and identifying an action of the at least one in relation with the data based at least in part on the other one or more images.

17. The method of claim 16, comprising:

presenting another data corresponding to at least a part of the data based at least in part on a determination that the action is to select the at least a part of the data.

18. The method of claim 16, comprising:

transmitting another data to another electronic device corresponding to the at least one based at least in part on the determination that the action is to select or move at least a part of the data, the other data corresponding to the at least a part.

19. The method of claim 11, wherein at least a part of the data is received from another electronic device external to the electronic device.

20. An apparatus comprising:

a processor; and a memory operatively coupled with the processor, the memory storing instructions that, when executed by the processor, cause the apparatus to:

obtain, via a camera unit operatively coupled with the processor, a first image capturing at least two objects external to the apparatus and further capturing at least one portion of a second image projected by a projector operatively coupled with the processor;

identify at least one part of data based at least in part on the at least two objects identified in the obtained first image; and present, via the projector, the data proximate to the at least two objects spaced apart from each other external to the apparatus,
wherein the second image is generated based on the data stored in the memory.

\* \* \* \* \*